United States Patent
Riley et al.

(10) Patent No.: US 10,157,017 B2
(45) Date of Patent: Dec. 18, 2018

(54) REPLICATING DATA USING DUAL-PORT NON-VOLATILE DUAL IN-LINE MEMORY MODULES

(71) Applicant: HEWLETT PACKARD ENTERPRISE DEVELOPMENT LP, Houston, TX (US)

(72) Inventors: Dwight D. Riley, Houston, TX (US); Joseph E. Foster, Houston, TX (US); Thierry Fevrier, Gold River, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,072

(22) PCT Filed: Apr. 30, 2015

(86) PCT No.: PCT/US2015/028619
§ 371 (c)(1),
(2) Date: Jan. 30, 2017

(87) PCT Pub. No.: WO2016/175855
PCT Pub. Date: Nov. 3, 2016

(65) Prior Publication Data
US 2017/0242593 A1    Aug. 24, 2017

(51) Int. Cl.
*G06F 3/06* (2006.01)
*G06F 13/16* (2006.01)
(Continued)

(52) U.S. Cl.
CPC .............. *G06F 3/065* (2013.01); *G06F 3/067* (2013.01); *G06F 3/0617* (2013.01);
(Continued)

(58) Field of Classification Search
CPC ...... G06F 3/065; G06F 3/0617; G06F 3/0619; G06F 3/067; G06F 3/0688; G06F 11/2017; G06F 13/16
(Continued)

(56) References Cited

U.S. PATENT DOCUMENTS 4,633,440 A    12/1986    Pakulski
6,816,889 B1   11/2004    Graham
(Continued)

FOREIGN PATENT DOCUMENTS

WO    WO-2014003764    1/2014

OTHER PUBLICATIONS

Haibo, Z. et al.; A Distributed Control System Communication Mode Based on UDP Datagram and Dual-port Memory, (Research Paper); May 15-17, 2009;4 Pages.
(Continued)

*Primary Examiner* — Than Nguyen
(74) *Attorney, Agent, or Firm* — Rathe Lindenbaum LLP (57) ABSTRACT

According to an example, data may be replicated using a dual-port nonvolatile dual in-line memory module (NVDIMM). A processor may request, through a first port of the dual-port NVDIMM, to store data to universal memory of the dual-port NVDIMM and to commit the data to remote storage according to a high-availability storage capability of the dual-port NVDIMM. The process may then receive a notification from the dual-port NVDIMM that the data has been transparently committed to the remote storage through a second port of the dual-port NVDIMM.

15 Claims, 10 Drawing Sheets

(51) Int. Cl.
*G06F 11/14* (2006.01)
*G06F 11/20* (2006.01)
*G06F 13/28* (2006.01)

(52) U.S. Cl.
CPC ............ *G06F 3/0619* (2013.01); *G06F 11/14* (2013.01); *G06F 11/2071* (2013.01); *G06F 13/16* (2013.01); *G06F 13/28* (2013.01); *G06F 3/0679* (2013.01); *G06F 3/0688* (2013.01)

(58) Field of Classification Search
USPC .................................................. 711/103, 162
See application file for complete search history.

(56) References Cited

U.S. PATENT DOCUMENTS

| | | |
|---|---|---|
| 2002/0112119 A1 | 8/2002 | Halbert et al. |
| 2011/0035575 A1 | 2/2011 | Kwon |
| 2012/0131253 A1 | 5/2012 | McKnight et al. |
| 2013/0086309 A1 | 4/2013 | Lee et al. |
| 2014/0201314 A1* | 7/2014 | Borkenhagen ....... G06F 11/1666 709/216 |
| 2014/0215277 A1 | 7/2014 | Judd |
| 2014/0237205 A1 | 8/2014 | Takefman et al. |
| 2015/0261446 A1* | 9/2015 | Lee ....................... G06F 13/385 711/103 |
| 2015/0262633 A1* | 9/2015 | Lee ...................... G11C 7/1075 710/308 |

OTHER PUBLICATIONS

International Search Report and Written Opinion; PCT/US2015/028619; dated Jan. 28, 2016; 10 pages.

\* cited by examiner

Request, through a first port of the dual-port NVDIMM, to store data to universal memory of the dual-port NVDIMM

810

Request, through the first port of the dual-port NVDIMM, to commit the data to remote storage according to a high-availability storage capability of the dual-port NVDIMM

820

Receive a notification from the dual-port NVDIMM that the data has been committed to the remote storage, wherein committing the data comprises transparently replicating the data to the remote storage through a second port of the dual-port NVDIMM

REPLICATING DATA USING DUAL-PORT NON-VOLATILE DUAL IN-LINE MEMORY MODULES

BACKGROUND

A non-volatile dual in-line memory module (NVDIMM) is a computer memory module that can be integrated into the main memory of a computing platform. The NVDIMM, or the NVDIMM and a host server, may provide data retention when electrical power is removed due to an unexpected power loss, system crash, or a normal system shutdown. The NVDIMM, for example, may include universal or persistent memory to maintain data in the event of the power loss or fatal events.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples for replicating data using dual-port non-volatile dual in-line memory modules (NVDIMMs). The dual-port architecture of the disclosed examples allows a NVDIMM to be mastered from either port. A port, for instance, is an interface or shared boundary across which two separate components of computer system may exchange information. The dual-port NVDIMM may include universal memory (e.g., persistent memory) such as memristor-based memory, magnetoresistive random-access memory (MRAM), bubble memory, racetrack memory, ferroelectric random-access memory (FRAM), phase-change memory (PCM), programmable metallization cell (PMC), resistive random-access memory (RRAM), Nano-RAM, and etc.

The dual-port NVDIMM may include a first port to provide a central processing unit (CPU) access to universal memory of the dual-port NVDIMM. In this regard, an operating system (OS) and/or an application program may master the dual-port NVDIMM through the first port. For example, the CPU may present a high-availability storage capability to at least one of an application program and operating system and receive a request from the at least one of the application program and operating system to store and replicate data according to the presented high-availability storage capability. The high-availability storage capability of the dual-port NVDIMM may include an active-active redundancy flow and an active-passive redundancy flow. Thus, through the first port of the dual-port NVDIMM, the CPU may request to store data to universal memory of the dual-port NVDIMM and may request to commit the data to remote or external storage according to the high-availability storage capability requested by the at least one of the application program and operating system. The remote storage may be storage that is external to the memory application server containing the CPU and dual-port NVDIMM.

The dual-port NVDIMM may also include a second port to provide a NVDIMM manager circuit access to the universal memory of the dual-port NVDIMM. The NVDIMM manager circuit may interface with remote storage that is external to a memory application server including the CPU and the dual-port NVDIMM. In this regard, the NVDIMM manager circuit may extract data from the universal memory of the dual-port NVDIMM via the second port to replicate to remote storage according to a high-availability storage capability. An OS stack may include for example an OS file system and application software high availability stacks on server message block (SMB) protocols on top of remote direct memory access (RDMA) fabrics. Thus, the disclosed examples remove these software layers from the CPU to optimize the performance of an application program. A network stack may include a network interface controller (NIC), such as a RDMA capable NIC.

According to an example, the CPU may receive a notification or acknowledgement from the dual-port NVDIMM that the data has been automatically committed (i.e., transparently replicated) to the remote storage through the second port of the dual-port NVDIMM. By replicating the stored data to remote storage, the stored data is thus made durable. Durable data is permanent, highly-available, and recoverable due to replication to remote storage. The remote storage may include, but is not limited to, an interconnect module bay of a blade enclosure or a memory array server and a replica memory application server of a memory fabric network.

With single-port NVDIMMs, when the CPU requests to store a transaction payload, the CPU has to block the transaction in order to move the bytes of the transaction payload from the single-port NVDIMM to a network OS-based driver stack OS-based driver stack then moves the bytes of the transaction payload to a remote storage, which stores the bytes in remote storage and transmits an acknowledgement to the CPU. Upon receiving the acknowledgement, the CPU may then finally unblock the transaction. As such, a user has to wait while the CPU replicates the transaction payload to remote storage for durability. Accordingly, implementing a high-availability model at the CPU or software level increases recovery time and may result in trapped data in event of a failure. High-availability models are designed to minimize system failures and handle specific failure modes for servers, such as memory application servers, so that access to the stored data is available at all times. Trapped data refers to data stored in the universal memory of NVDIMM that has not been made durable (i.e., has not been replicated to remote storage). With increases in recovery time and trapped data, users may be disappointed with the industry goals set for universal memory.

According to the disclosed examples, dual-port NVDIMMs may implement high-availability models on a hardware level, which is transparent from the CPU. That is, a dual-port NVDIMM may perform a data migration in the background using the second port of the dual-port NVDIMM so that the CPU is not burdened with performing the time-consuming data migration steps discussed above with single-port NVDIMMs.

The disclosed examples provide the technical benefits and advantages of enhancing recovery time objectives and recovery data objectives for application programs and/or OSs. This allows application programs and/or OSs to benefit from the enhanced performance of universal memory while gaining resiliency in the platform hardware. These benefits are achieved using a single architectural design that bridges legacy software architecture into a new realm where application programs and OSs have direct access to universal memory. For example, the disclosed dual-port NVDIMMs provide a hardware extension that may utilize system-on-chips (SOCs) to quickly move trapped NVDIMM data on a fabric channel between memory application servers. In other words, replication of data using the dual-port NVDIMMs may ensure that the trapped NVDIMM data is made durable in remote storage. The fabric channels of the disclosed examples may be dedicated or shared over a customized or a traditional network fabric (e.g., Ethernet). Thus, utilizing the replicating data using the dual-port NVDIMMs provides a single architecture that is customized for moving NVDIMM data at hardware speeds between memory application servers in a blade enclosure, across racks, or between data centers to achieve enterprise class resiliency.

Figure 1:
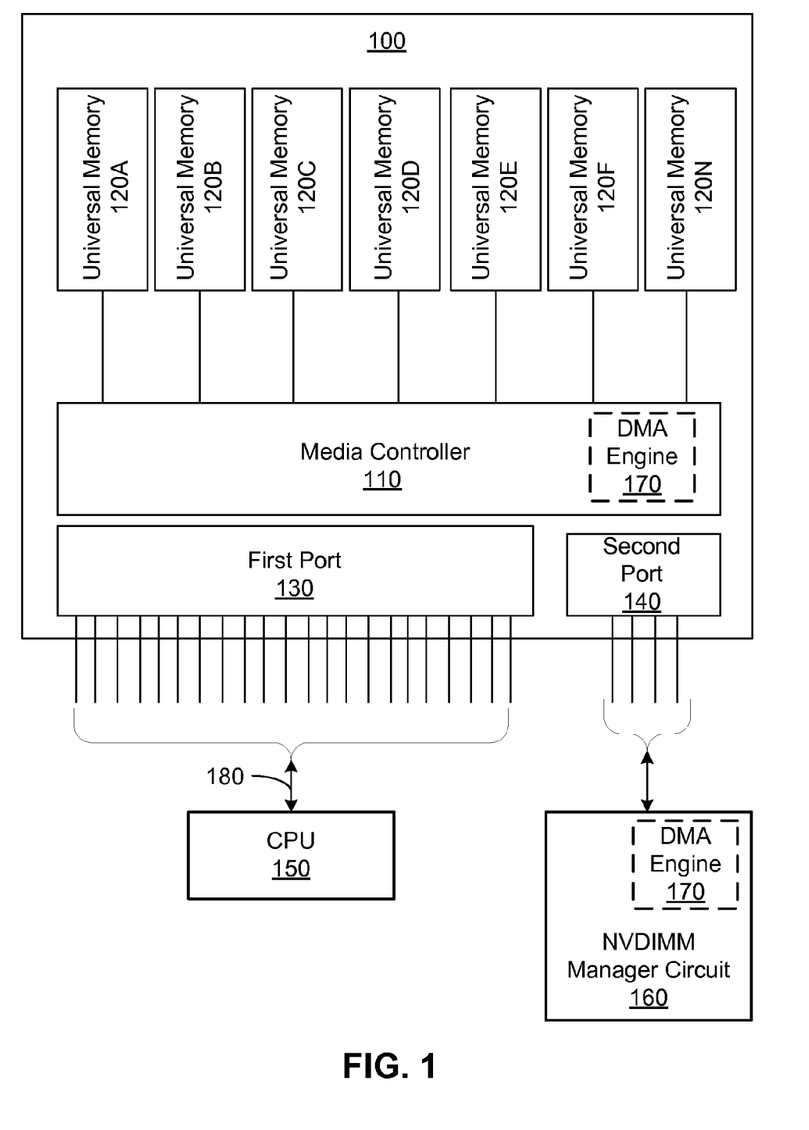
FIG. 1 shows a block diagram of a dual-port non-volatile dual in-line memory module (NVDIMM), according to an example of the present disclosure.

With reference to FIG. 1, there is shown a block diagram of a dual-port NVDIMM 100, according to an example of the present disclosure. It should be understood that the dual-port NVDIMM 100 may include additional components and that one or more of the components described herein may be removed and/or modified without departing from a scope of the dual-port NVDIMM 100. The dual-port NVDIMM 100 may include a media controller 110, universal memory 120A-N (where the number of universal memory components may be greater than or equal to one), a first port 130, and a second port 140.

The dual-port NVDIMM 100 is a computer memory module that can be integrated into the main memory of a computing platform. The dual-port NVDIMM 100 may be included in a memory application server that is part of a blade enclosure. The dual-port NVDIMM 100, for example, may include universal memory 120A-N (e.g., persistent) to maintain data in the event of the power loss. The universal memory may include, but is not limited to, memristor-based memory, magnetoresistive random-access memory (MRAM), bubble memory, racetrack memory, ferroelectric random-access memory (FRAM), phase-change memory (PCM), programmable metallization cell (PMC), resistive random-access memory (RRAM), Nano-RAM, and etc.

The media controller 110, for instance, may communicate with its associated universal memory 120A-N and control access to the universal memory 120A-N by a central processing unit (CPU) 150 and a NVDIMM manager circuit 160. For example, the media controller 110 may provide access to the universal memory 120A-N through the first port 130 and the second port 140. Each port, for instance, is an interface or shared boundary across which the CPU 150 and the NVDIMM manager circuit 160 may access regions of the universal memory 120A-N.

According to an example, the CPU 150 may access the universal memory 120A-N through the first port 130. The CPU 150 may be a microprocessor, a micro-controller, an application specific integrated circuit (ASIC), field programmable gate array (FPGA), or other type of circuit to perform various processing functions for a computing platform. In one example, the CPU 150 is a server. On behalf of an application program and/or operating system, for instance, the CPU 150 may generate sequences of primitives such as read, write, swap, etc. requests to the media controller 110 through the first port 130 of the dual-port NVDIMM 100.

According to an example, the NVDIMM manager circuit 160 may access the universal memory 120A-N through the second port 140. The NVDIMM manager circuit 160 is external to the dual-port NVDIMM 100 and interfaces to a network memory fabric via a fabric interface chip with network connections to remote storage in the network memory fabric, such as replica memory application servers and memory array servers. The NVDIMM manager circuit 160 may be a system on a chip (SOC) that integrates a processor core and memory into a single chip.

As discussed further in examples below, a direct memory access (DMA) engine 170 may be integrated into at least one of the media controller 110 or the NVDIMM manager circuit 160. The DMA engine 170, for example, may move the bytes of data between hardware subsystems independently of the CPU 150. The various components shown in FIG. 1 may be coupled by a fabric interconnect (e.g., bus) 180, where the fabric interconnect 180 may be a communication system that transfers data between the various components.

Figure 2A:
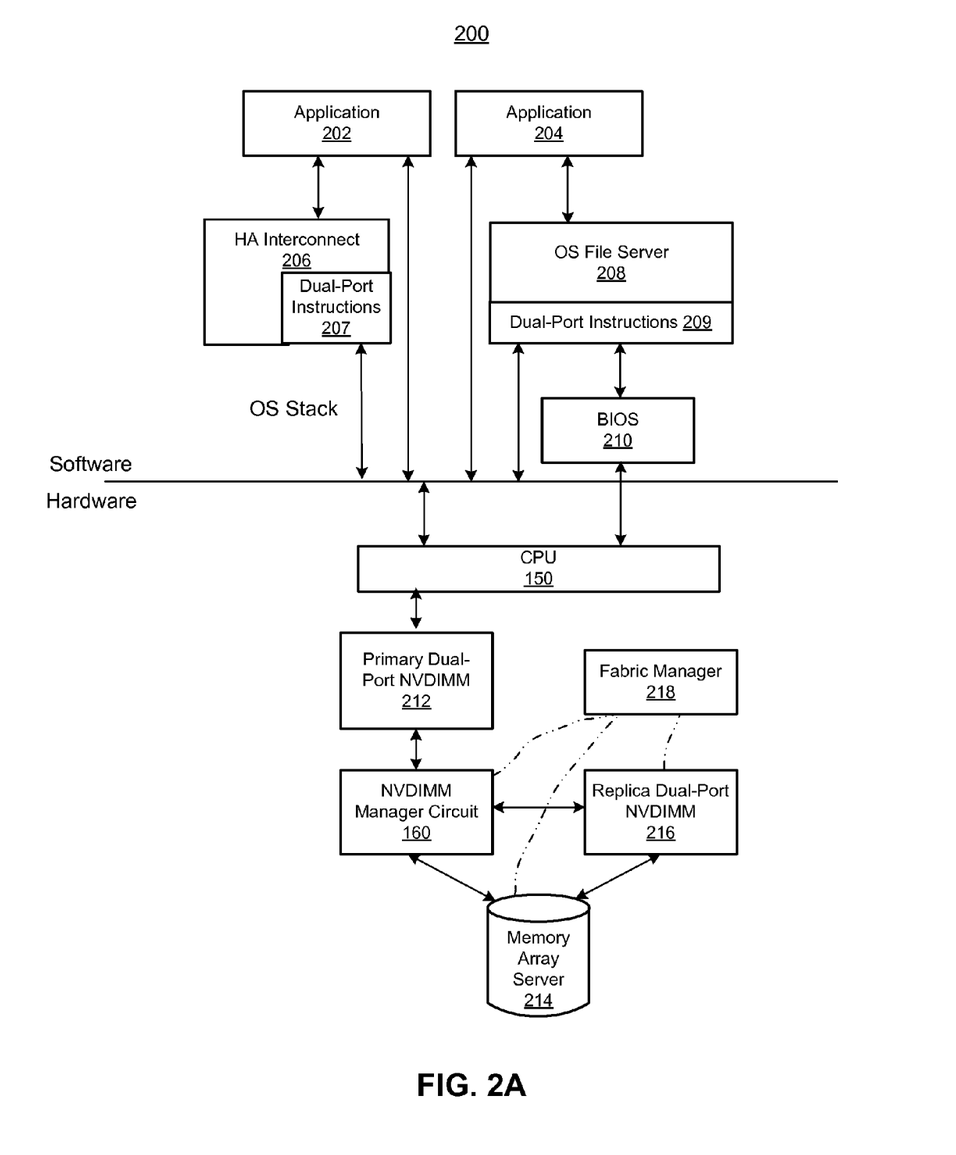
FIG. 2A shows a block diagram of a dual-port NVDIMM architecture, according to an example of the present disclosure.

FIG. 2A shows a block diagram of a dual-port NVDIMM architecture 200, according to an example of the present disclosure. It should be understood that the dual-port NVDIMM architecture 200 may include additional components and that one or more of the components described herein may be removed and/or modified without departing from a scope of the dual-port NVDIMM architecture 200.

According to an example, the software side of the dual-port NVDIMM architecture 200 may include programs 202 and 204, a high-availability interconnect 206 (e.g., server message block (SMB) or remote direct memory access (RDMA) on top of a RDMA software and hardware fabric) with dual-port machine-readable instructions 207, an OS file system 208 with dual-port machine-readable instructions 209, and basic input/output system (BIOS) 210. The BIOS 210, for instance, may define memory pools and configurations for the dual-port NVDIMM architecture 200 and pass dual-port NVDIMM interface definitions to the OS file server 150. In this regard, the OS file server 150 may be aware of the high-availability capabilities of the dual-port in the NVDIMM architecture 200. For instance, the OS fileserver 150 may be aware that data stored on a dual-port NVDIMM may be transparently replicated to remote storage for durability. In this example, application program 204 may be a file system-only application that benefits from the dual-port machine-readable instructions 209 included in the aware OS fileserver 208. According to another example, the application program 202 may have received dual-port NVDIMM interface definitions from the CPU 150, and thus, be aware of the high-availability capabilities of the dual-port in the NVDIMM architecture 200. Thus, the byte-addressable application program 202 may benefit from the dual-port machine-readable instructions 207 included in an optimized high-availability interconnect 206 for the transparent replication of data to remote storage.

According to an example, the software side of the dual-port NVDIMM architecture 200 may include the CPU 150, a primary dual-port NVDIMM 212, a NVDIMM manager circuit 160, a memory array server 214, a replica dual-port NVDIMM, and a fabric manager 218. The CPU 150, may access a first port 130 of the primary dual-port NVDIMM 212 to issue a request to store data in universal memory and replicate the data to remote storage, such as the memory array server 214 and/or the replica dual-port NVDIMM 216, according to a high-availability capability request received from application programs 202 and 204. The NVDIMM manager circuit 160, for example, may extract the stored data from a second port 140 of the primary dual-port NVDIMM 212 as instructed by the fabric manager 218. The fabric manager 218 may setup, monitor, and orchestrate a selected high-availability capability for the dual-port architecture 200 as further described below. For example, the fabric manager 218 may route the extracted data between the primary dual-port NVDIMM 212, the memory array server 214, and the replica dual-port NVDIMM 216 to establish a durable and data-safe dual-port NVDIMM architecture 200 with high-availability redundancy and access performance enhancements.

Figure 2B:
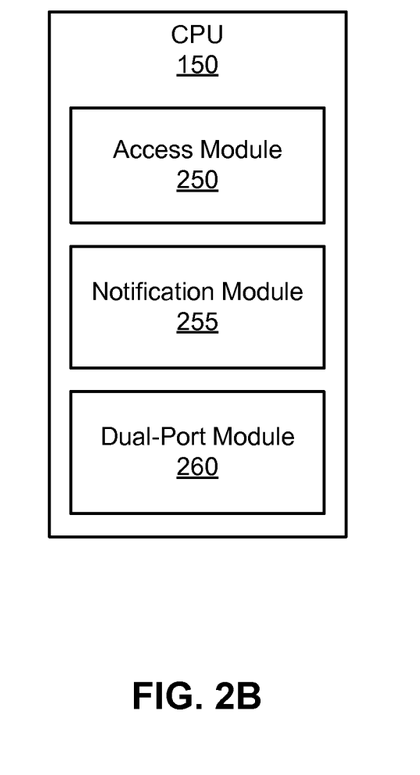
FIG. 2B shows a block diagram of a central processing unit (CPU) of a dual-port NVDIMM architecture, according to an example of the present disclosure.

FIG. 2B shows a block diagram of a CPU 150 of a dual-port NVDIMM architecture, according to an example of the present disclosure. The CPU 150 may include and process the functions of an access module 250, a notification module 255, and a dual-port module 260. These functions provide an encompassing set of capabilities to enhance application program resiliency and data migration performance when implementing the dual-port NVDIMM 100.

The access module 212 may access the first port 130 of the dual-port NVDIMM 100 perform a sequence of primitives such as read, write, swap, etc. For example, the access module 212 may request, via the first port 130 of the dual-port NVDIMM 100, to store data to universal memory of the dual-port NVDIMM 100. According to another example, the access module 212 may request, via the first port 130 of the dual-port NVDIMM 100, to commit the data to remote storage according to a high-availability storage capability of the dual-port NVDIMM 100. The notification module 255 may receive a notification from the first port 130 of the dual-port NVDIMM 100 that the data has been committed to the remote storage. The notification module 255 receives the notification after the data is transparently replicated to the remote storage through a second port 140 of the dual-port NVDIMM 100. The dual-port module 260, for instance, may transmit dual-port activation settings for the dual-port NVDIMM 100 through the first port 130 of the dual-port NVDIMM 100. The dual-port activation settings may include active-active setting and an active-passive setting. Modules 250-260 of the CPU 150 are discussed in greater detail below. In this example, modules 250-260 are circuits implemented in hardware. In another example, the functions of modules 250-260 may be machine readable instructions stored on a non-transitory computer readable medium and executed by a CPU 150, as discussed further below.

Figure 3:
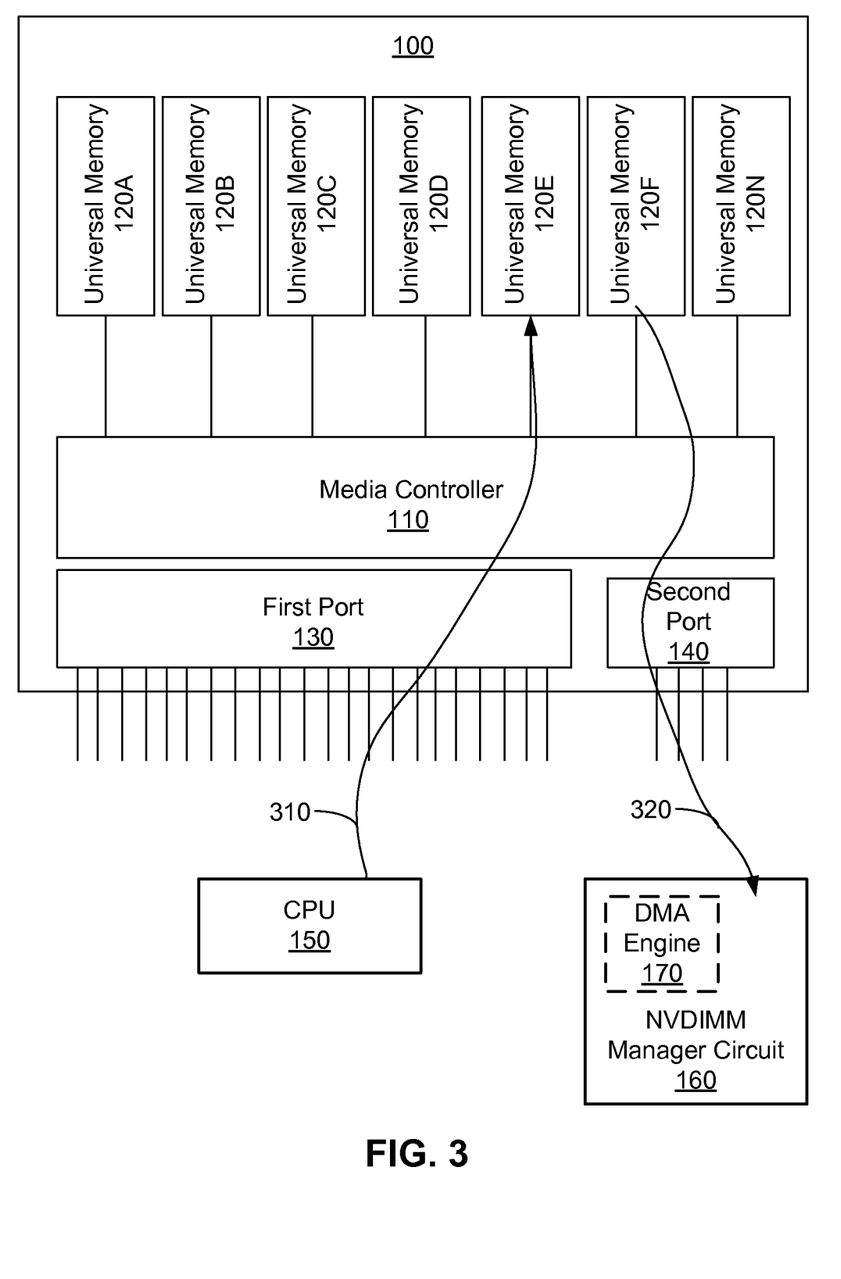
FIG. 3 shows a block diagram of an active-passive implementation of the dual-port NVDIMM, according to an example of the present disclosure.

FIG. 3 shows a block diagram of an active-passive implementation of the dual-port NVDIMM 100, according to an example of the present disclosure. In this implementation of the dual-port NVDIMM 100, the DMA engine 170 is external from the dual-port NVDIMM 100 and integrated with the NVDIMM manager circuit 160. The CPU 150 may issue requests as shown in arc 310 to the media controller through the first port 130. For example, the CPU 150 may issue requests including a write request to store data in the universal memory 120A-N, a commit request to replicate data to remote storage, and a dual-port setting request through the first port 130. The dual-port setting request may include a request for the media controller 110 to set the first port 130 of the dual-port NVDIMM 110 to an active state so that the CPU 150 can actively access the dual-port NVDIMM 100 and set the second port 140 of the dual-port NVDIMM 100 to a passive state to designate the NVDIMM manager circuit 160 as a standby failover server.

According to this example, the media controller 110 may receive a request from the external DMA engine 170 at a predetermined trigger time to retrieve the stored data in the universal memory 120A-N and transmit the stored data to the external DMA engine 170 through the passive second port 140 of the dual-port NVDIMM as shown in arc 320. The external DMA engine 170 may then make the stored data durable by creating an offline copy of the stored data in remote storage via the NVDIMM Manager Circuit 160.

Figure 4:
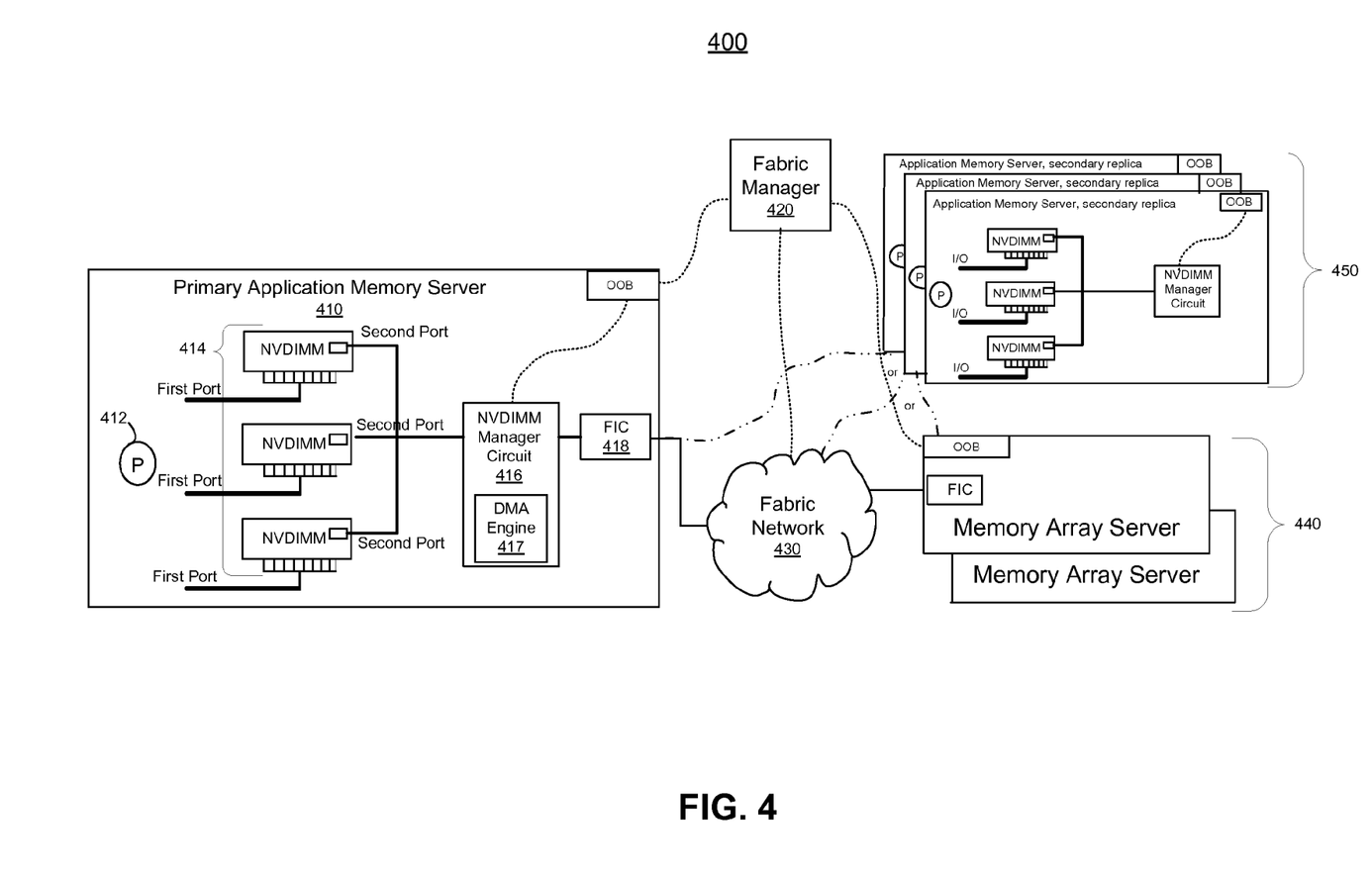
FIG. 4 shows a block diagram of memory fabric architecture including the active-passive implementation of the dual-port NVDIMM described in FIG. 3, according to an example of the present disclosure.

FIG. 4 shows a block diagram of memory fabric architecture 400 including the active-passive implementation of the dual-port NVDIMM 100 described in FIG. 3, according to an example of the present disclosure. It should be understood that the memory fabric architecture 400 may include additional components and that one or more of the components described herein may be removed and/or modified without departing from a scope of the memory fabric architecture 400. The memory fabric architecture 400 may include a primary application memory server 410, a memory fabric manager 420, fabric network 430, memory array server 440, and secondary replica application memory servers 450, which are read-only application memory servers.

The primary application memory server 410 may include a processor 412, dual-port NVDIMMs 414, a NVDIMM manager circuit 416, and a fabric interconnect chip (FIC) 418. The processor 412 may, for example, be the CPU 150 discussed above. The processor 412, via the first ports of the dual-port NVDIMMs 414, may issue a request to store data in universal memory and commit data to remote storage, and further request that the second ports of the dual-port NVDIMMs 414 are set to a passive state to designate the NVDIMM manager circuit 416 as a standby failover server. The NVDIMM manager circuit 416 may, for example, be the NVDIMM manager circuit 160 discussed above. In this memory fabric architecture 400, the DMA engine 417 is integrated with the NVDIMM manager circuit 416. The DMA engine 417 of the NVDIMM manager circuit 416 may access the dual-port NVDIMMs 414 through their second ports to retrieve stored data at a predetermined trigger time. The DMA engine 417 may then move the bytes of retrieved data to remote storage via the FIC 418 and the fabric network 430 to create a durable offline copy of the stored data in remote storage, such as the memory array servers 440 and/or the secondary replica application memory servers 450. Once a durable offline copy is created in remote storage, the CPU 150 may be notified by the media controller 110.

According to an example, the primary application memory server 410 may pass to the fabric manager 420 parameters via out-of-band management channels. These parameters may include parameters associated with the encryption and management of the encrypting keys on the fabric network 430 and/or the memory array servers 440. These parameters may also include high-availability attributes and capacities (e.g., static or dynamic) and access requirements (e.g., expected latencies, queue depths, etc.) according to service level agreements (SLAs) provided by the dual-port NVDIMMs 414, the fabric manager 420, and memory array servers 440.

The fabric manager 420 may setup, monitor, and orchestrate a selected high-availability capability for the memory fabric architecture 400. For example, the fabric manager 420 may manage universal memory ranges from the memory array servers 440 in coordination with the application memory servers that are executing the high-availability capabilities that are enabled for the dual-port NVDIMMs 414. The fabric manager 420 may commit memory ranges on the memory array servers 440. These committed memory ranges may be encrypted, compressed, or even parsed for storage and access optimizations. The fabric manager 420 may transmit event notifications of the memory array servers 440 to the application memory servers in the memory fabric. According to other examples, the fabric manager 440 may migrate the committed memory ranges to other memory array servers, synchronize updates to all of the application memory servers (e.g., primary 410 and secondary 450) in the fabric network 430 with the memory array servers 440, and may control whether the memory array servers 440 are shared or non-shared in the fabric network 430.

According to an example, the NVDIMM manager circuit 416 may use the network fabric 430, in synchronization with the fabric manager 420, to move a data working set with possible optimizations (e.g., encryption and compression) to the selected memory array servers 440. According to another example, under the control of the fabric manager 420, the connections to the secondary replica application memory servers 450 (e.g., other memory application servers or rack of memory application servers that act as a secondary replica of the primary application memory server 410) are established in a durable and data-safe way to provide another level of high-availability redundancy and access performance enhancements.

Figure 5:
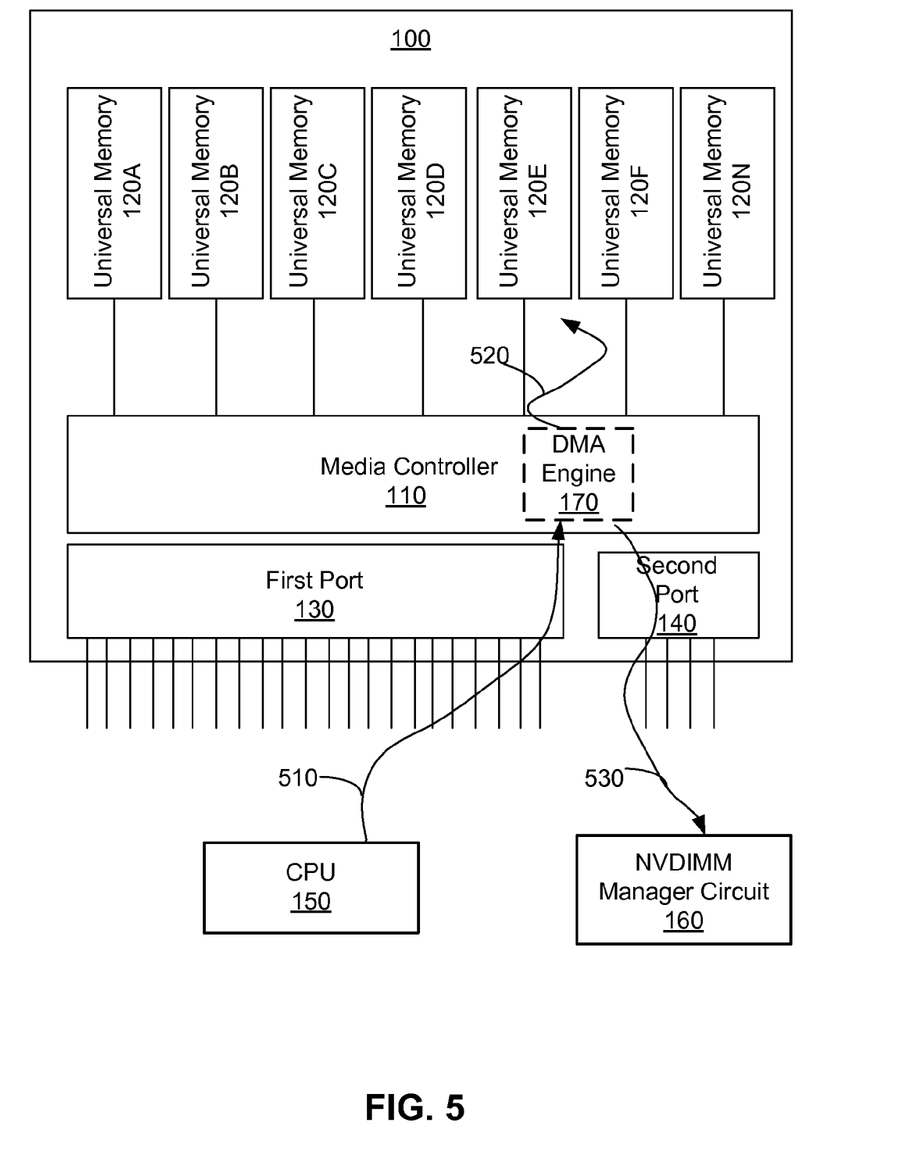
FIG. 5 shows a block diagram of an active-active implementation of the dual-port NVDIMM, according to an example of the present disclosure.

FIG. 5 shows a block diagram of an active-active implementation of the dual-port NVDIMM 100, according to an example of the present disclosure. In this implementation of the dual-port NVDIMM 100, the DMA engine 170 integrated with the media controller 110. The CPU 150 may issue requests as shown in arc 510 to the media controller 110 through the first port 130. For example, the CPU 150 may issue requests including a write request to store data in the universal memory 120A-N, a request to commit the data to remote storage, and a dual-port setting request through the first port 130. The dual-port setting request may include a request for the media controller 110 to set the first port 130 of the dual-port NVDIMM 110 and the second port 140 of the dual-port NVDIMM 100 to active state so that the CPU 150 and the NVDIMM manager circuit 160 may access the dual-port NVDIMM 100 simultaneously.

According to this example, the integrated DMA engine 170 of the media controller 110 may store the received data to universal memory 120A-N as shown in arc 520 and automatically move the bytes of the data to the NVDIMM manager circuit 160 in real-time through the active second port 140 as shown in arc 530 to replicate the data to in remote storage. Once a durable copy of the data is created in remote storage, the CPU 150 may be notified by the media controller 110.

Figure 6:
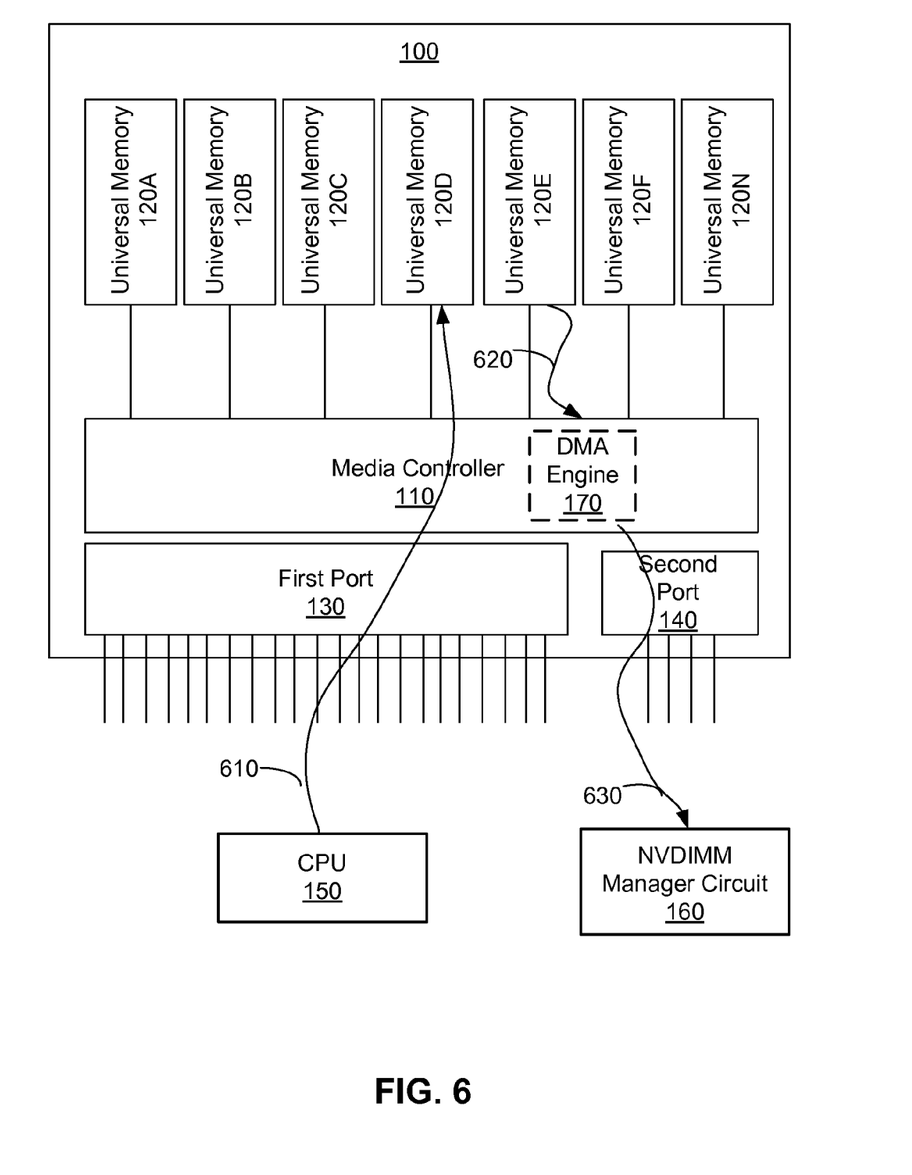
FIG. 6 shows a block diagram of an active-active implementation of the dual-port NVDIMM, according to another example of the present disclosure.

FIG. 6 shows a block diagram of an active-active implementation of the dual-port NVDIMM 100, according to another example of the present disclosure. In this implementation of the dual-port NVDIMM 100, the DMA engine 170 is also integrated with the media controller 110. The CPU 150 may issue requests as shown in arc 610 to the media controller 110 through the first port 130. For example, the CPU 150 may issue requests including a write request to store data in the universal memory 120A-N, a request to commit the data to remote storage, and a dual-port setting request through the first port 130. The dual-port setting request may include a request for the media controller 110 to set the first port 130 of the dual-port NVDIMM 110 and the second port 140 of the dual-port NVDIMM 100 to active state so that the CPU 150 and the NVDIMM manager circuit 160 may access the dual-port NVDIMM 100 simultaneously.

According to this example, however, the integrated DMA engine 170 does not replicate the data received from the CPU in real-time. Instead, integrated DMA engine 170 of the memory controller 110 may retrieve the stored data in the universal memory 120A-N at a predetermined trigger time as shown in arc 620. In this regard, the integrated DMA engine 170 may transmit the stored data through the passive second port 140 of the dual-port NVDIMM to the NVDIMM manager circuit 160 as shown in arc 630 to replicate the data in remote storage. Once a durable copy of the data is created in remote storage, the CPU 150 may be notified by the media controller 110.

Figure 7:
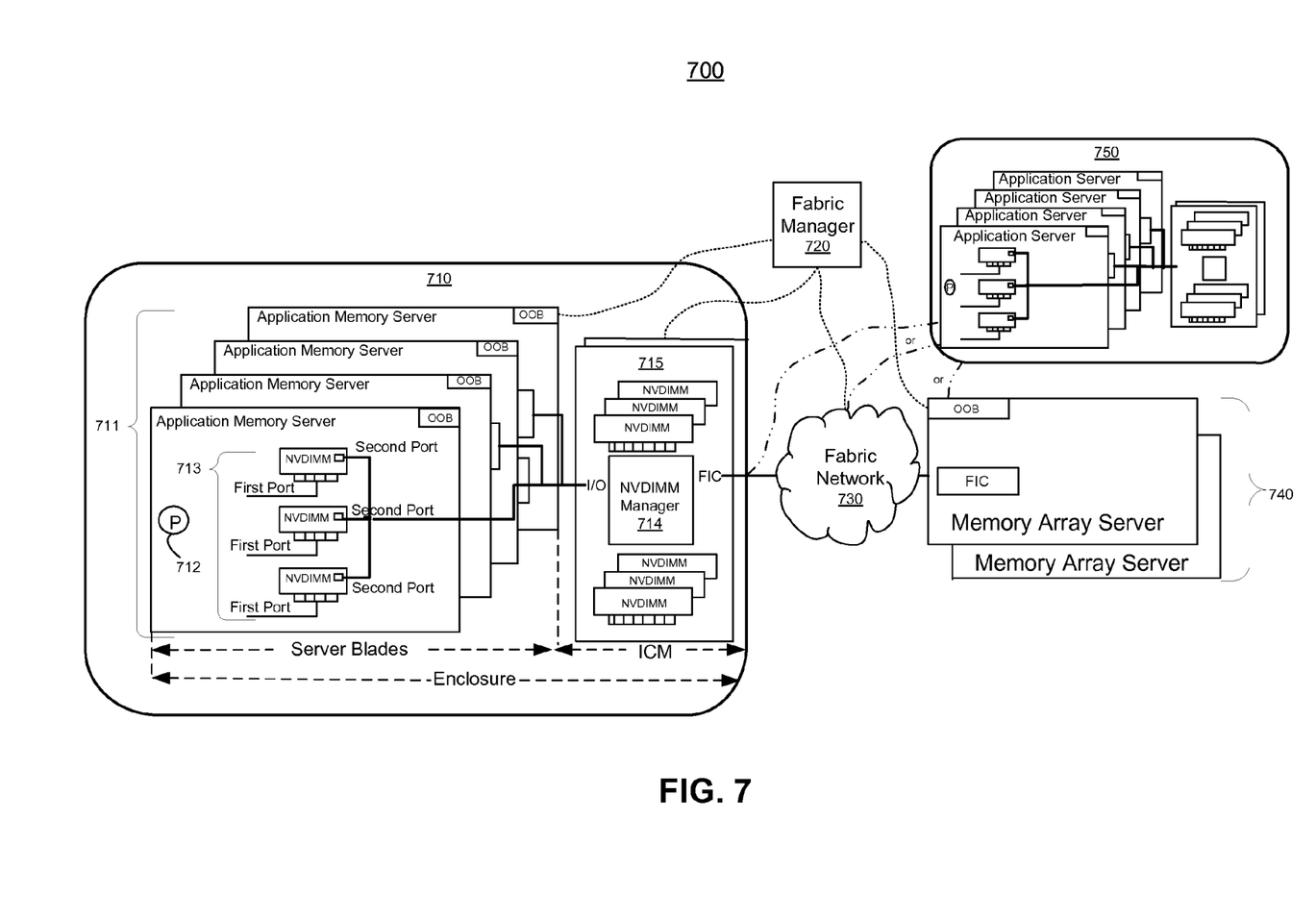
FIG. 7 shows a block diagram of memory fabric architecture including the active-active implementation of the dual-port NVDIMM, according to an example of the present disclosure.

FIG. 7 shows a block diagram of memory fabric architecture 700 including the active-active implementation of the dual-port NVDIMM 100 described in FIGS. 5 and 6, according to an example of the present disclosure. It should be understood that the memory fabric architecture 700 may include additional components and that one or more of the components described herein may be removed and/or modified without departing from a scope of the memory fabric architecture 700. The memory fabric architecture 700 may include a primary blade enclosure 710, a memory fabric manager 720, fabric network 730, memory array server 740, and secondary blade enclosure 750.

The primary blade enclosure may include server blades comprising a plurality of application memory servers 711. Each of the plurality of application memory servers 711 may include a processor 712 and dual-port NVDIMMs 713. The processor 712 may, for example, be the CPU 150 discussed above. In this example, the dual-port NVDIMMs 713 each have a DMA engine integrated within their memory controller. The processor 712, via the first ports of the dual-port NVDIMMs 713, may issue a request to store data in universal memory, a request to commit the data to remote storage, and a request that the second ports of the dual-port NVDIMMs 711 be set to an active state to allow the NVDIMM manager circuit 714 of the interconnect bay module (ICM) 715 simultaneous access to the dual-port NVDIMMs 711. The NVDIMM manager circuit 714 is integrated in the ICM 715 of the memory blade enclosure 710. The ICM 715, for example, may also include dual-port NVDIMMs for storage within the ICM 715.

In this example, the DMA engines, which are integrated within the media controllers of each of the plurality of dual-port NVDIMMs 713 of the application memory servers 711, may automatically move the bytes of data received from the processor 712 to the NVDIMM manager 714 through the active second ports of the dual-port NVDIMMs 713 in real-time for replication to the dual-port NVDIMMs on the ICM 715. According to another example, the DMA engines may instead trigger, at a predetermined time, the migration of the stored data to the NVDIMM manager 714 through the active second ports for replication to the dual-port NVDIMMs on the ICM 715. In both examples, once a durable copy of the data is created in remote storage, the CPU 150 may be notified by the media controller 110.

The memory fabric architecture 700 is a tiered solution where the ICM 715 may be used to quickly replicate data off of the plurality of memory application servers 711. This tiered solution allows replicated data to be stored within the primary memory blade enclosure 710. As a result of replicating data replication within the ICM bay 715 (but remote from the plurality of memory application servers 711), the replicated data can be managed and controlled as durable storage. With durable data stored in the blade memory enclosure 710, a tightly coupled local-centric, high-availability domain (e.g., an active-active redundant application memory server solution within the enclosure) is possible.

According to an example, the NVDIMM manager 714 may, in concert with the fabric manager 720, further replicate the stored data to the memory array server 740 and the secondary blade enclosure 750 via the fabric network 730 to provide another level of high-availability redundancy and access performance enhancements in the memory fabric architecture 700. The functions of the fabric manager 720, fabric network 730, memory array servers 740, and secondary blade enclosure 750 are similar to that of the fabric manager 420, fabric network 430, memory array server 440, and secondary replica application memory servers 450 discussed above in FIG. 4.

Figure 8:
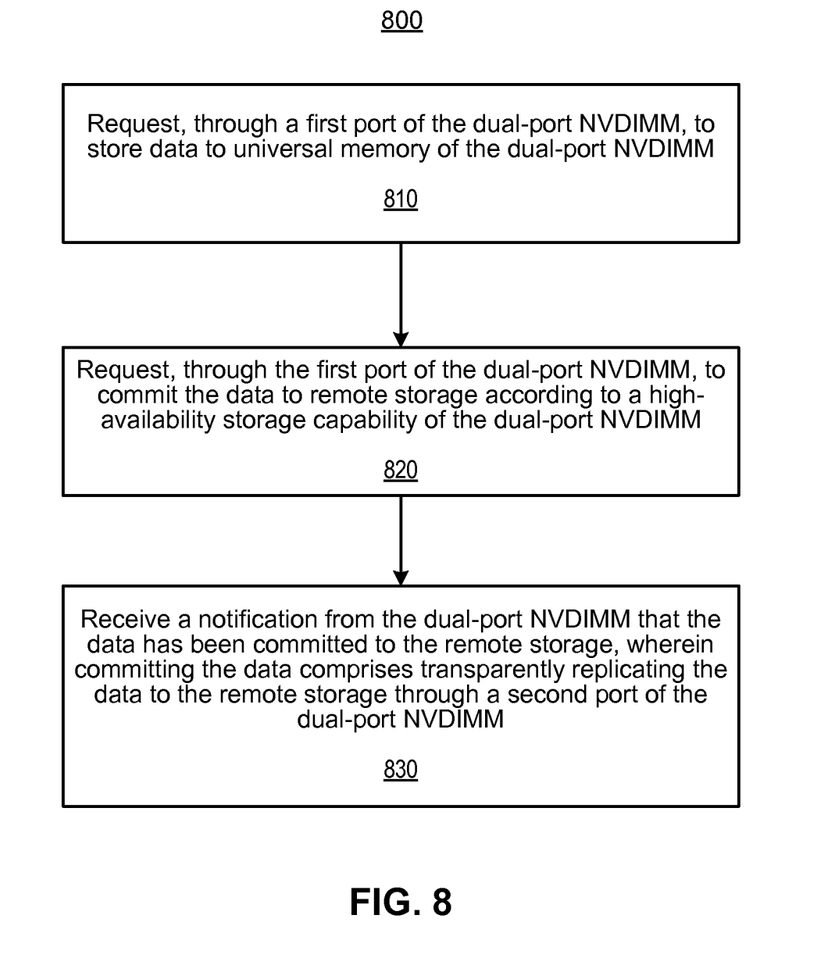
FIG. 8 shows a flow diagram of a method to replicate data using a dual-port NVDIMM, according to an example of the present disclosure.

With reference to FIG. 8, there is shown a flow diagram of a method 800 to replicate data using a dual-port NVDIMM 100, according to an example of the present disclosure. It should be apparent to those of ordinary skill in the art that method 800 represents generalized illustrations and that other sequences may be added or existing sequences may be removed, modified or rearranged without departing from the scope of the method.

According to an example, the CPU 150 may present a high-availability storage capability to at least one of an application program and operating system and receive a request from the at least one of the application program and operating system to store and replicate data according to the presented high-availability storage capability. The high-availability storage capability of the dual-port NVDIMM 100 may include an active-active redundancy flow and an active-passive redundancy flow.

In block 810, the access module 250 of the CPU 150 may request, through a first port 130 of the dual-port NVDIMM 100, to store data to universal memory of the dual-port NVDIMM.

In block 820, the access module 250 of the CPU 150 may request through the first port 130 of the dual-port NVDIMM 100, to commit the data to remote storage according to the high-availability storage capability of the dual-port NVDIMM 100. The request to commit the data may include committing the data to remote storage according to an active-active redundancy flow. In this example, the dual-port module 260 of the CPU 150 may request the dual-port NVDIMM 100 to set both its first port 130 and its second port 140 to an active state so that the CPU 150 can access the first port 130 and a NVDIMM manager circuit 160 can access the second port 140 simultaneously. Alternatively, the request to commit the data may include committing the data to remote storage according to an active-passive redundancy flow. In this case, the dual-port module 206 may request the dual-port NVDIMM 100 to set the first port 130 of the dual-port NVDIMM 100 to an active state so that the CPU 150 can access the dual-port NVDIMM 100 and request the dual-port NVDIMM 100 to set the second port 140 of the dual-port NVDIMM 100 to a passive state to designate a NVDIMM manager circuit 160 as a standby failover server.

In block 830, the notification module 255 of the CPU 150 may receive a notification from the dual-port NVDIMM 100 that the data has been committed to the remote storage. According to an example, the committing of the data includes transparently replicating the data to the remote storage through a second port of the dual-port NVDIMM as implemented by the NVDIMM manager circuit 160 in combination with the fabric manager 218. By transparently replicating the data to the remote storage, the method 800 may initiate the bypass of at least one of an operating system stack and a network stack in order to enhance system performance by moving the data at hardware speeds between memory application servers in a blade enclosure, across racks, or between data centers. The remote storage may include a memory array server and a replica memory application server in a memory fabric. Additionally, the remote storage may include persistent storage within an interconnect, such as an interconnect module bay of a blade memory enclosure.

Some or all of the operations set forth in the method 800 may be contained as utilities, programs, or subprograms, in any desired computer accessible medium. In addition, method 800 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 9:
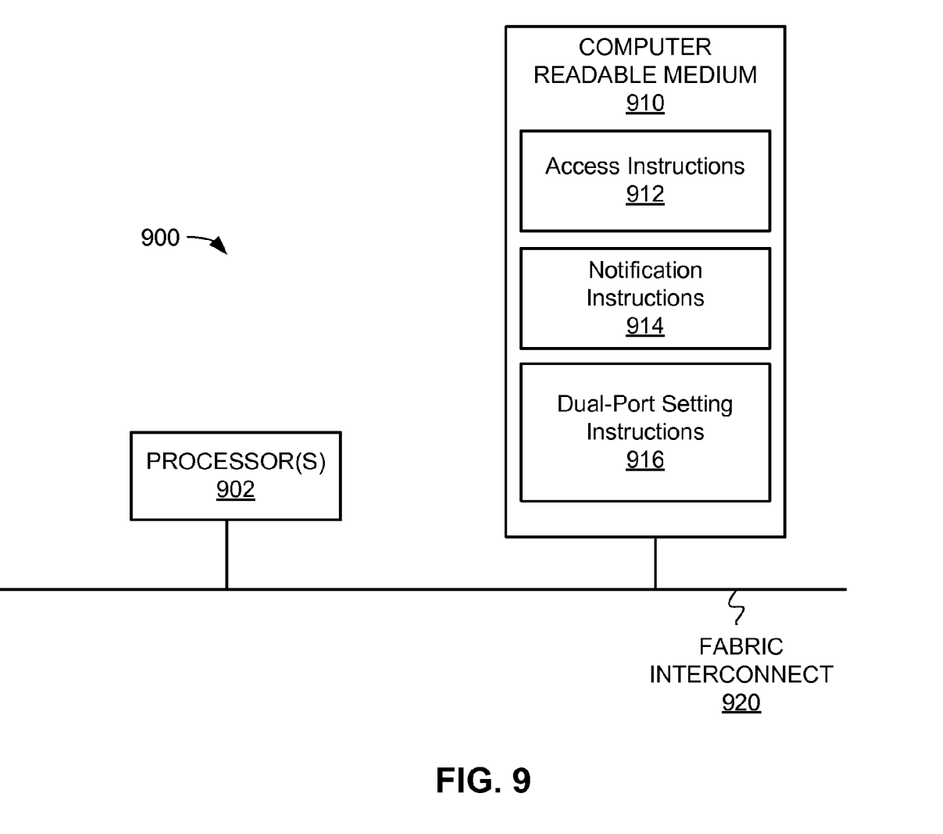
FIG. 9 shows a schematic representation of a computing device, which may be employed to perform various functions of a CPU, according to an example of the present disclosure.

Turning now to FIG. 9, a schematic representation of a computing device 900, which may be employed to perform various functions of the CPU 150 as depicted in FIG. 1, is shown according to an example implementation. The device 900 may include a processor 902 coupled to a computer-readable medium 910 by a fabric interconnect 920. The computer readable medium 910 may be any suitable medium that participates in providing instructions to the controller 902 for execution. For example, the computer readable medium 910 may be non-volatile media, such as an optical or a magnetic disk; volatile media, such as memory.

The computer-readable medium 910 may store instructions to perform method 800. For example, the computer-readable medium 910 may include machine readable instructions such as access instructions 912 to request, through a first port of the dual-port NVDIMM, to store data to universal memory of the dual-port NVDIMM and commit the data to remote storage according to the high-availability storage capability of the dual-port NVDIMM. The notification instructions 914 may receive a notification from the dual-port NVDIMM that the data has been committed to the remote storage. The Dual-port setting instructions 916 may set the dual-ports of the dual-port NVDIMM to an active-active redundancy flow or an active-passive redundancy flow. Accordingly, the computer-readable medium 910 may include machine readable instructions to perform method 800 when executed by the processor 902.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for replicating data using a dual-port non-volatile dual in-line memory module (NVDIMM), comprising:
    requesting, by a processor through a first port of the dual-port NVDIMM, to store data to universal memory of the dual-port NVDIMM;
    requesting, through the first port of the dual-port NVDIMM, to commit the data to remote storage according to a high-availability storage capability of the dual-port NVDIMM, wherein the high-availability storage capability of the dual-port NVDIMM comprises at least one of an active-active redundancy flow and an active-passive redundancy flow; and
    receiving a notification from the dual-port NVDIMM that the data has been committed to the remote storage, wherein committing of the data to the remote storage through a second port of the dual-port NVDIMM is automatic, bypassing at least one of an operating system stack and a network stack.

2. The method of claim 1, comprising:
    presenting the high-availability storage capability to at least one of an application program and operating system; and
    receiving a request from the at least one of the application program and operating system to store and replicate data according to the presented high-availability storage capability.

3. The method of claim 1, wherein requesting to commit the data to remote storage according to an active-active redundancy flow, comprises:
    requesting the dual-port DVDIMM to set both the first port and the second port of the dual-port NVDIMM to an active state so that the processor can access the first port and a NVDIMM manager circuit can access the second port simultaneously.

4. The method of claim 1, wherein requesting to commit the data to remote storage according to an active-passive redundancy flow, comprises:
    requesting the dual-port NVDIMM to set the first port of the dual-port NVDIMM to an active state so that the processor can access the dual-port NVDIMM; and
    requesting the dual-port NVDIMM to set the second port of the dual-port NVDIMM to a passive state to designate a NVDIMM manager circuit as a standby failover server.

5. The method of claim 1, wherein the remote storage comprises at least one of a memory array server and a replica memory application server in a memory fabric.

6. The method of claim 1, wherein the remote storage comprises persistent storage within an interconnect module bay of a blade memory enclosure.

7. The method of claim 1, further comprising retrieving data stored in the remote storage with a media controller and transmitting the retrieved data to the NVDIMM manager circuit through the second port while the second port is in the passive state.

8. A system for replicating data, comprising:
    a dual-port non-volatile dual in-line memory module (NVDIMM) storing machine readable instructions; and
    a processor to execute the machine readable instructions, the processor comprising:
        an access module to issue a store command to store data to universal memory of the dual-port NVDIMM and issue a replicate command to replicate the data to external storage according to dual-port activation settings of the dual-port NVDIMM, wherein the store command and the replicate command are transmitted through a first port of the dual-port NVDIMM;
        a notification module to acknowledge a notification from the dual-port NVDIMM that the data has been replicated to the external storage, wherein replicating the data comprises an automatic commitment of the data to the external storage through a second port of the dual-port NVDIMM, bypassing at least one of an operating system stack and a network stack; and
        a dual-port module to issue the dual-port activation settings for the dual-port NVDIMM.

9. The system of claim 8, wherein to issue the replicate command, the access module is to initiate the bypassing of at least one of the operating system stack and the network stack.

10. The system of claim 8, comprising a presentation module to:
    present the dual-port activation settings to at least one of an application program and operating system; and
    receive a request from the at least one of the application program and operating system to store and replicate data according to the dual-port activation settings.

11. The system of claim 8, wherein the dual-port module is to issue the dual-port activation setting to implement at least one of an active-active redundancy flow and an active-passive redundancy flow.

12. The system of claim 11, wherein to issue the dual-port setting, the dual-port module is to at least one of:
    request the dual-port DVDIMM to set both the first port and the second port of the dual-port NVDIMM to an active state so that the processor can access the first port and a NVDIMM manager circuit can access the second port simultaneously; and
    request the dual-port NVDIMM to set the first port of the dual-port NVDIMM to an active state so that the processor can access the dual-port NVDIMM and set the second port of the dual-port NVDIMM to a passive state to designate a NVDIMM manager circuit as a standby failover server.

13. The system of claim 12 further comprising:
    a media controller to retrieve data stored from the universal memory; and
    the NVDIMM manager circuit to receive the retrieved data from the media controller through the second port while the second port is in the passive state.

14. A non-transitory computer readable medium to replicating data using a dual-interface non-volatile dual in-line memory module (NVDIMM), including machine readable instructions executable by a processor to:
  present a high-availability storage capability of the dual-interface NVDIMM to at least one of an application program and operating system, wherein the high-availability storage capability of the dual-port NVDIMM comprises at least one of an active-active redundancy flow and an active-passive redundancy flow;
  receive a request from the at least one of the application program and operating system to replicate data according to the high-availability storage capability;
  transmit, through the first interface of the dual-interface NVDIMM, a request to commit data to remote storage according to the high-availability storage capability; and
  acknowledge a notification from the dual-interface NVDIMM that the data has been committed to the remote storage, wherein committing the data to remote storage includes automatically committing the data to the remote storage through a second interface of the dual-interface NVDIMM.

15. The non-transitory computer readable medium of claim 14, wherein to transparently replicate the data to the remote storage through the second interface, the machine readable instructions are executable by a processor to initiate a bypass of at least one of an operating system stack and a network stack.

* * * * *